United States Patent [19]
Maemura

[11] Patent Number: 5,544,307
[45] Date of Patent: Aug. 6, 1996

[54] MICROCOMPUTER DEVELOPMENT SUPPORT SYSTEM OPERABLE WITH ONLY BACKGROUND MONITOR AND WITHOUT CACHE REPLACEMENT

[75] Inventor: Kouji Maemura, Kanagawa, Japan

[73] Assignee: NEC Corporation, Tokyo, Japan

[21] Appl. No.: 283,153

[22] Filed: Aug. 3, 1994

[30] Foreign Application Priority Data

Aug. 3, 1993 [JP] Japan ................................ 5-191546

[51] Int. Cl.⁶ ........................... G06F 9/00; G06F 11/00
[52] U.S. Cl. ..................... 395/180; 395/500; 395/375; 364/232.8; 364/243.41; 364/267.91
[58] Field of Search ................... 395/500, 183.11, 395/575, 180; 371/22.6

[56] References Cited

U.S. PATENT DOCUMENTS

| | | | |
|---|---|---|---|
| 5,249,266 | 9/1993 | Dye et al. | 395/162 |
| 5,317,711 | 5/1994 | Bourekas et al. | 395/425 |
| 5,321,828 | 6/1994 | Phillips et al. | 395/500 |
| 5,446,851 | 8/1995 | Yamaguchi | 395/375 |
| 5,455,936 | 10/1995 | Maemura | 395/183.11 |

FOREIGN PATENT DOCUMENTS

| | | |
|---|---|---|
| 474256A2 | 3/1992 | European Pat. Off. . |
| 525672A2 | 2/1993 | European Pat. Off. . |
| 3-78038 | 4/1991 | Japan . |
| 2256733 | 12/1992 | United Kingdom . |

Primary Examiner—Kevin J. Teska
Assistant Examiner—Ayni Mohamed
Attorney, Agent, or Firm—Whitham, Curtis, Whitham & McGinn

[57] ABSTRACT

A microcomputer development support system for a microprocessor, includes an instruction substituting circuit tracing a memory access performed by the microprocessor and substituting a predetermined branch instruction for an instruction which is read out from a predetermined address of a user memory by the microprocessor, and a background monitor configured to give the microprocessor a memory space which is separated from the user memory but is peculiar to the microcomputer development support system. After the predetermined branch instruction has been substituted and after a break acknowledge signal informing an execution of the predetermined branch instruction has been activated, the microcomputer development support system executes a program stored in the background monitor. At the same time, the microcomputer puts the cache memory into the "cache off" condition when it starts to execute the program of the background monitor. When the execution of the program of the background monitor is terminated, the microcomputer returns the cache memory into the "cache on" condition.

4 Claims, 7 Drawing Sheets

MICROCOMPUTER DEVELOPMENT SUPPORT SYSTEM OPERABLE WITH ONLY BACKGROUND MONITOR AND WITHOUT CACHE REPLACEMENT

BACKGROUND OF THE INVENTION

1. Field of the Invention

The present invention relates to a microcomputer development support system, and more specifically to a microcomputer development support system used for development of a microprocessor having a cache memory therein.

2. Description of Related Art

Recent microprocessors are apt to internally contain a cache memory for attaining a high speed memory access. Accordingly, the performance of microprocessors has become high, but, the work for debugging a system constituted of this type of microprocessor internally containing the cache memory, has become difficult. The reason for this is that this type of microprocessor outputs its execution states only when a memory access is "mishit" (e.g., a "miss") in the cache memory, and therefore, it is not possible to monitor the current execution state of the program by tracing the memory access.

In the case of debugging a system having this type of microprocessor, a microcomputer development support system is used. When only the executing process of a program is to be traced by the microcomputer development support system, all memory accesses required by the microprocessor can be outputted to an external of the microprocessor by making the cache memory of the microprocessor inactive (this state is called "cache off"). However, this tracing under the "cache off" state is greatly different in an executing time from a real operation of the microprocessor performed using the cache memory, and therefore, this debugging method is not so effective for a system required to have a real-time operation.

In order to debug a real time operation while using the microcomputer development support system, a break function is used to obtain the real time result. This break function causes the microprocessor to execute a branch instruction at an arbitrary address of a program, and on the other hand, at a branch destination address there is beforehand prepared program for outputting an internal condition of the microprocessor and an intermediate result of the program execution which the user wishes to know, so that the user can observe whether or not an expected processing has been executed.

One typical conventional break function is disclosed in Japanese Patent Application Laid-open Publication No. Hei 03-078038 (JP-A-3-078038) entitled "In-Circuit Emulator".

Now, this typical conventional break function will be described with reference to FIG. 1 which is a block diagram of the "In-Circuit Emulator" shown in JP-A-3-078038 and also with reference to FIG. 2 which is a timing chart illustrating an operation of the "In-Circuit Emulator".

In FIG. 1, a microcomputer development support system is constituted by elements located at a right side of a line 600, and is coupled to a microprocessor 61 having a cache memory therein and coupled to a first data bus 601 and an address bus 603.

More specifically, the microcomputer development support system includes a user memory 62, which is divided into a user space and a front-end monitor which is required to operate the microcomputer development support system (it is necessary for the user of the microcomputer development support system to prepare this memory region for a microcomputer development support system).

The microcomputer development support system also includes a background monitor 65, independently of the user memory 62, and coupled to a second data bus 602, which is also coupled to the user memory 62. A memory space switching circuit 67 is coupled to the address bus 603 and the user memory 62 through another address bus 610. This memory space switching circuit 67 operates to separate the background monitor 65 from the user space under the control of the front-end monitor.

A breakpoint register 64 coupled to the second data bus 602 and configured to be set with a break point by a user. A comparator 66 has a first input coupled to the address bus 603 and a second input coupled to the breakpoint register 64, for generating a coincidence signal or break request signal 607 when a coincidence is detected.

The microcomputer development support system also includes an instruction substituting circuit 63 which is coupled to the microprocessor 61 through the first data bus 601 and to the user memory 62 through the second data bus 602, and which is controlled by the break request signal 607 outputted from the comparator 66. This instruction substituting circuit 63 substitutes a branch instruction for an instruction which should be read to the microprocessor, when the break request signal 607 is activated. This type of branch instruction is called a "break instruction".

Operation will be explained with reference to FIG. 2, which shows a timing chart of the operation of the conventional microcomputer development support system.

When a user utilizes the break function, before execution of a debugging, file user sets the breakpoint register 64 with an address at which an interruption is to be generated. The comparator 66 compares an address outputted onto the address bus 603 from the microprocessor 61, with a content of the breakpoint register 64. If they are concordant with each other, the break request signal 607 is activated as shown by "A" in FIG. 2. If the break request signal 607 becomes active, the instruction substituting circuit 63 substitutes the break instruction as shown by "B" in FIG. 2, for the instruction which the microprocessor should read at that time in the user space access.

If the break instruction is executed by the microprocessor 61, the operation is branched to a head of a front-end monitor program within the user memory 62. As mentioned above, the front-end monitor 63 is in a space which is reserved in the user memory 62 and which is utilized by the microcomputer development support system. In accordance with the front-end monitor program, the cache memory within the microprocessor 61 is brought into a "cache off" condition, and the primary factor of the break is analyzed, as shown by "C" in FIG. 2.

The change into the "cache off" condition can be set in a program, and is actually realized in various manners by the microprocessor. For example, Intel's microprocessor "80486" and Motorola's microprocessors "68030" and "68040" are such that the status is changed by setting the status setting registers. Mips' R3000 adopts a method of setting a space to be executed in a "cache on" condition and a space to be executed in a "cache off" condition, on the basis of additional information for the memory space (the range designated by the address). Accordingly, the change into the "cache off" condition can be performed in either of the above mentioned methods with no problem. The switching of the address space is more preferable, since a high speed switching is possible, and therefore, it is suitable to realize a high speed operation.

If, as the result of the primary factor analysis, it is concluded that a trap is to be certainly performed, the memory space switching circuit 67 is instructed to control to the effect that, in succeeding accesses, the user memory 62 is not accessed, but the background monitor 65 is accessed. In the background monitor 65, a dump processing of an internal register is performed, and finally, a RETI (return-from-interrupt) instruction is executed so that the microprocessor 61 executes an original instruction before it was substituted by the break instruction (called a "resumption instruction"), as shown by "B", "C" and "D" in FIG. 2. Only the resumption instruction is executed under the "cache off" condition, but, after the resumption instruction has been executed, the cache is returned back to the "cache on" condition. These controls of the cache memory are performed on the basis of the front-end monitor.

The prior art microcomputer development support system as mentioned above needs to cause the front-end monitor to run on the user memory 62 to realize the break function in the microprocessor 61 including the cache memory therein. The following reasons are why the front-end monitor is necessary.

(1) There is no means other than the front-end monitor, for switching the operation to the background monitor 65.

(2) The front-end monitor is required since the switching-over to the "cache off" condition is controlled in accordance with a monitor program.

In the case that the switching-over to the "cache off" condition can be controlled in accordance with the monitor program by the background monitor 602, since the foreground monitor (front-end monitor) and the background monitor are not distinguished from each other internally of the microprocessor 61, if this processing is performed by the background monitor, there is a possibility that an instruction registered in the cache memory is hit during an execution in the user space. Namely, a malfunction occurs. On the other hand, if the processing in question is carried out by the foreground monitor, since it is in the user memory space, even if the cache memory is hit, no malfunction occurs.

(3) There is no means for erasing the break instruction registered in the cache memory. Because of this, the resumption instruction after the break processing is executed under the "cache off" condition, so that the break instruction already registered in the cache memory is intentionally neglected. However, in the case that the same address as the address where the breakpoint is previously set, is accessed again, if the cache memory is hit, the break processing is repeated many times. As a result, the break point cannot be canceled until the end of the program. Therefore, it is necessary in the prior art for the front-end monitor to judge the necessity of break.

Because of the above mentioned reasons, in the prior art microcomputer development support system, the front-end monitor has been used for realizing the break function in the microprocessor internally containing the cache memory. However, the front-end monitor uses the resources of the user system (for an example, control signals for address bus of the user system, the user memory, etc.). This is disadvantageous in that a user's memory space (for examples, addresses and contents of programs) is inevitably limited.

Further, in a case that the microcomputer development support system itself utilizes the user system to debug a system under development, when malfunction occurs in the user system, the monitor program itself does not properly function. The inherent function of the microcomputer development support system itself cannot be exerted.

Furthermore, since, as mentioned in the above Item (3), the prior art microcomputer development support system does not have the means for erasing the break instruction remaining in the cache memory, it happens that the front-end monitor 603 operates unnecessarily even if the break processing was unnecessary. As a result, the real time operation is lost in the user program execution.

SUMMARY OF THE INVENTION

Accordingly, it is an object of the present invention to provide a microcomputer development support system which has overcome the above mentioned defects of the conventional systems.

Another object of the present invention is to provide a microcomputer development support system which can operate without a front-end monitor provided in a user memory.

The above and other objects of the present invention are achieved in accordance with the present invention by a microcomputer development support system for a microprocessor, the microprocessor including therein at least an execution unit for executing a program and a cache memory associated to the execution unit, the microprocessor having a function for inhibiting a cache registration in a cache replace access to the cache memory, and another function for putting the cache memory into a "cache off" condition in a programmed manner, the microprocessor being configured to generate a break acknowledge signal when the execution unit has executed a predetermined branch instruction, the microcomputer development support system comprising:

instruction substituting means for tracing a memory access of the microcomputer and responding to a break request signal to supply to the execution unit of the microcomputer the predetermined branch instruction in place of an instruction which has been read from a predetermined address of a user memory to be supplied to the microcomputer;

a background monitor configured to give the microprocessor a memory space which is separated from a user space but is peculiar to the microcomputer development support system, a breakpoint register for registering an address where a break processing is to be performed;

a comparator comparing a content of the breakpoint register with an address outputted from the microcomputer, for generating the break request signal when coincidence is detected;

a memory space switching circuit receiving the break acknowledge signal and the address outputted from the microprocessor, for separating the background monitor from the user memory, so that the background monitor functions as the memory space which is separated from the user space but is peculiar to the microcomputer development support system, whereby after the break request signal is activated, a processing is performed on the basis of a program of the background monitor, the microcomputer being configured to respond to the break request signal to put the cache memory into the "cache off" condition when it starts to execute the program of the background monitor, the microcomputer returning the cache memory into a "cache on" condition when the execution of the program of the background monitor is terminated.

The above and other objects, features and advantages of the present invention will be apparent from the following description of preferred embodiments of the invention with reference to the accompanying drawings.

DESCRIPTION OF THE PREFERRED EMBODIMENTS

Figure 1:
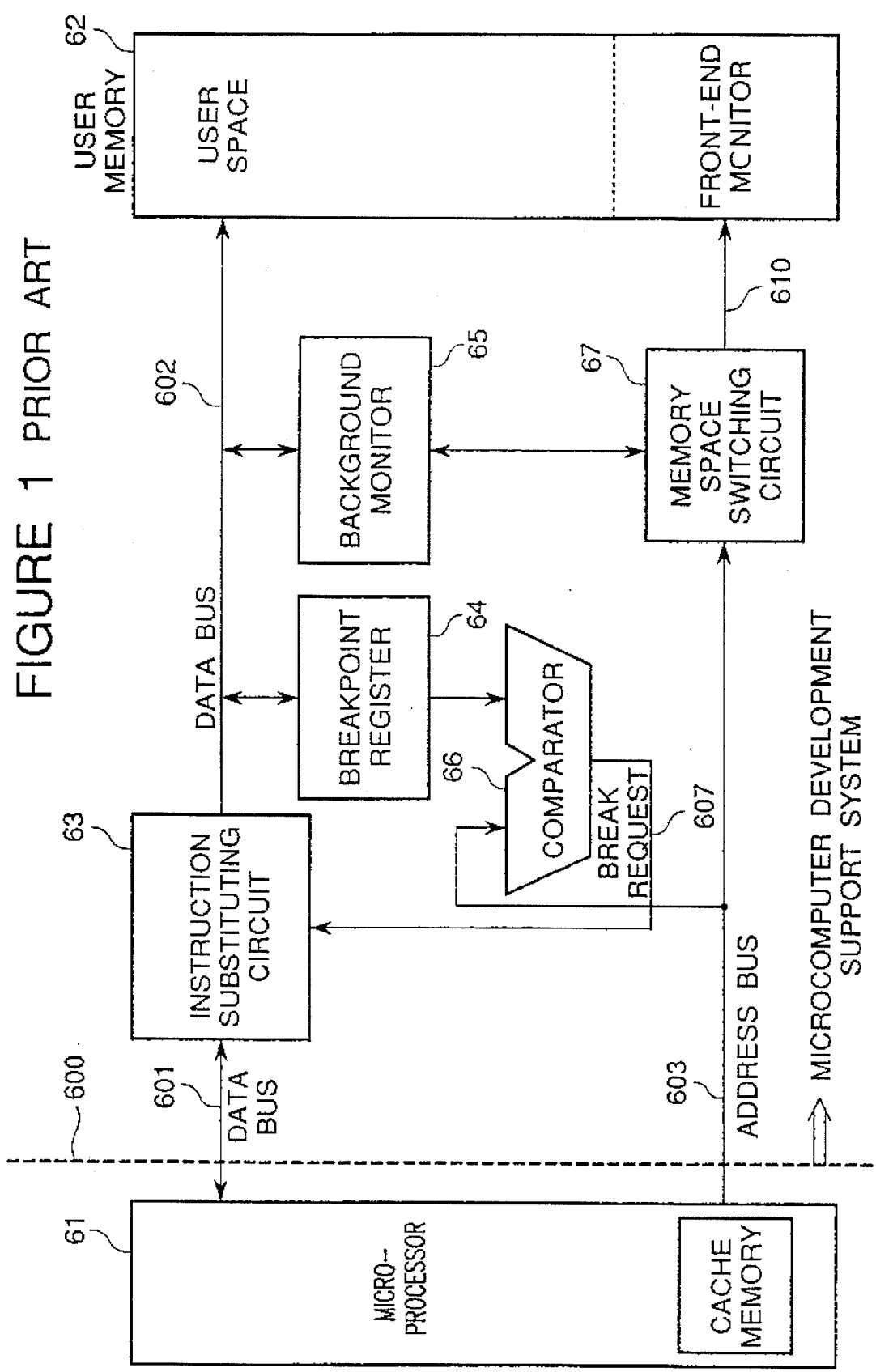
FIG. 1 is a block diagram of one typical conventional microcomputer development support system.
Figure 2:
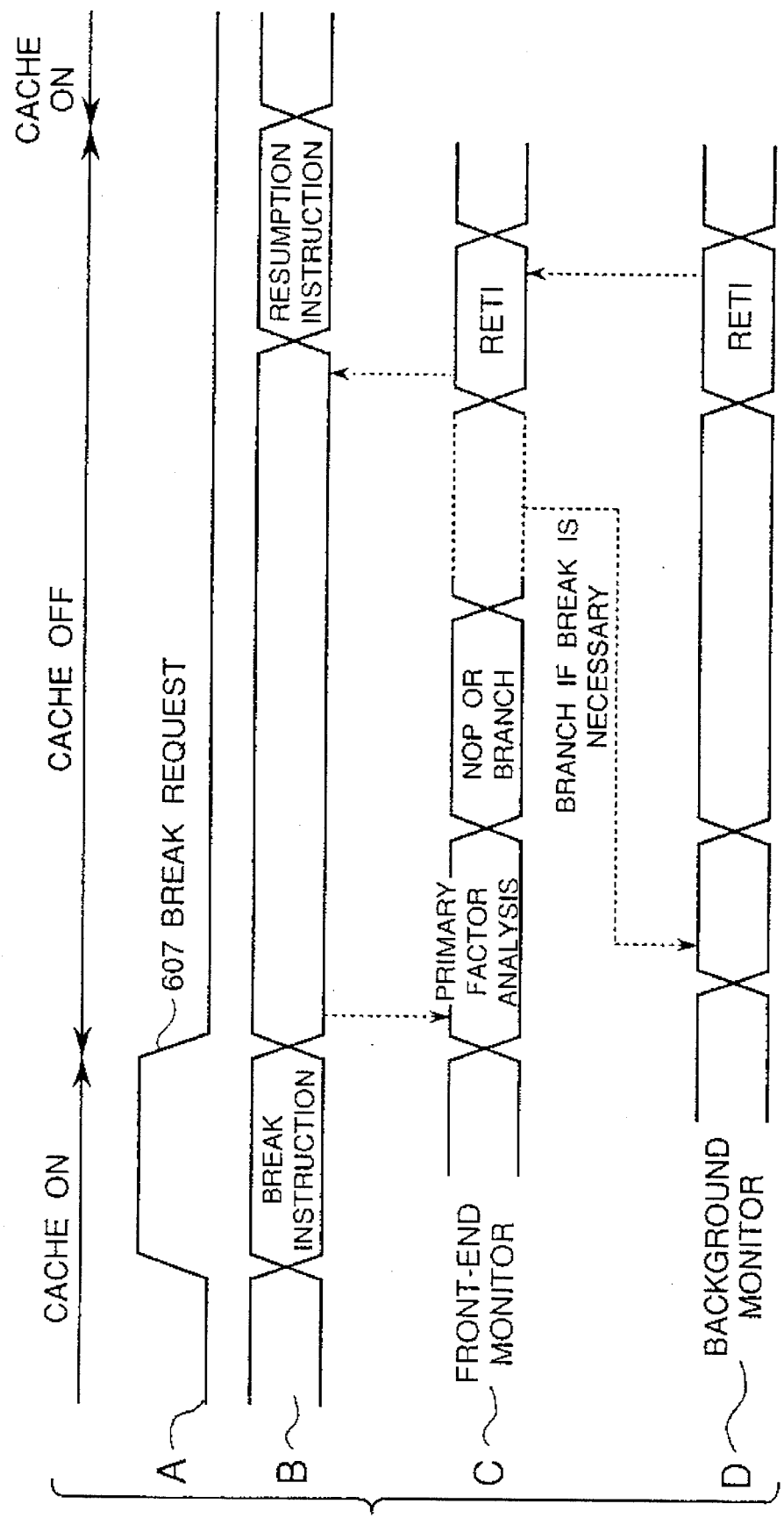
FIG. 2 is a timing chart illustrating an operation of the conventional microcomputer development support system shown in FIG. 1.
Figure 3:
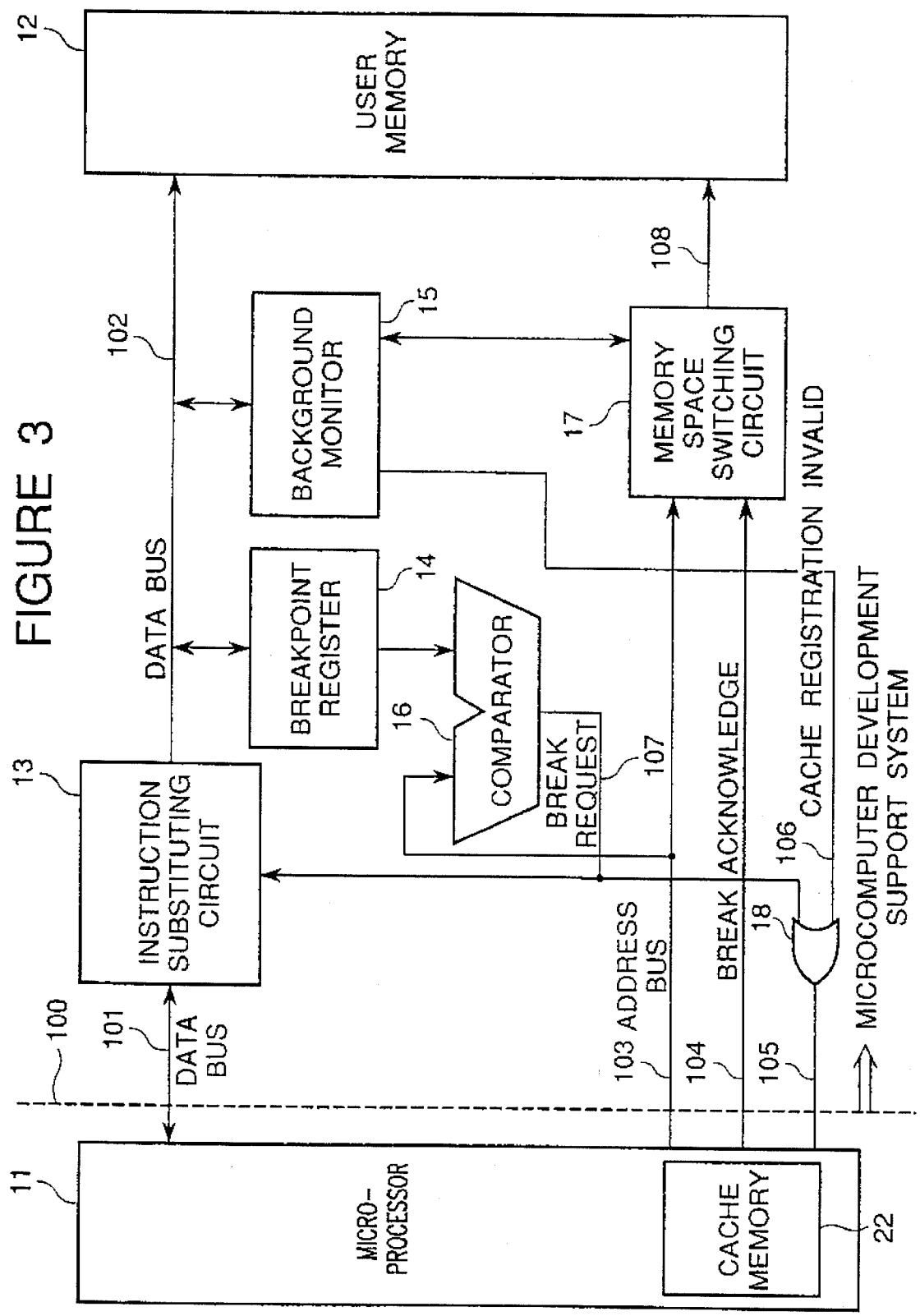
FIG. 3 is a block diagram of a first embodiment of the microcomputer development support system in accordance with the present invention.

Referring to FIG. 3, there is shown a block diagram of a first embodiment of the microcomputer development support system in accordance with the present invention.

As shown in FIG. 3, the microcomputer development support system in accordance with the present invention is constituted by elements located at a right side of a line 100, and is coupled to a microprocessor 11 which has a cache memory 22 therein and which is also coupled to a first data bus 101 and an address bus 103. This microprocessor 11 is configured to generate a break acknowledge signal 104 for informing that the microprocessor 11 has executed a break instruction, and also to receive a cache registration control signal 105.

Figure 4:
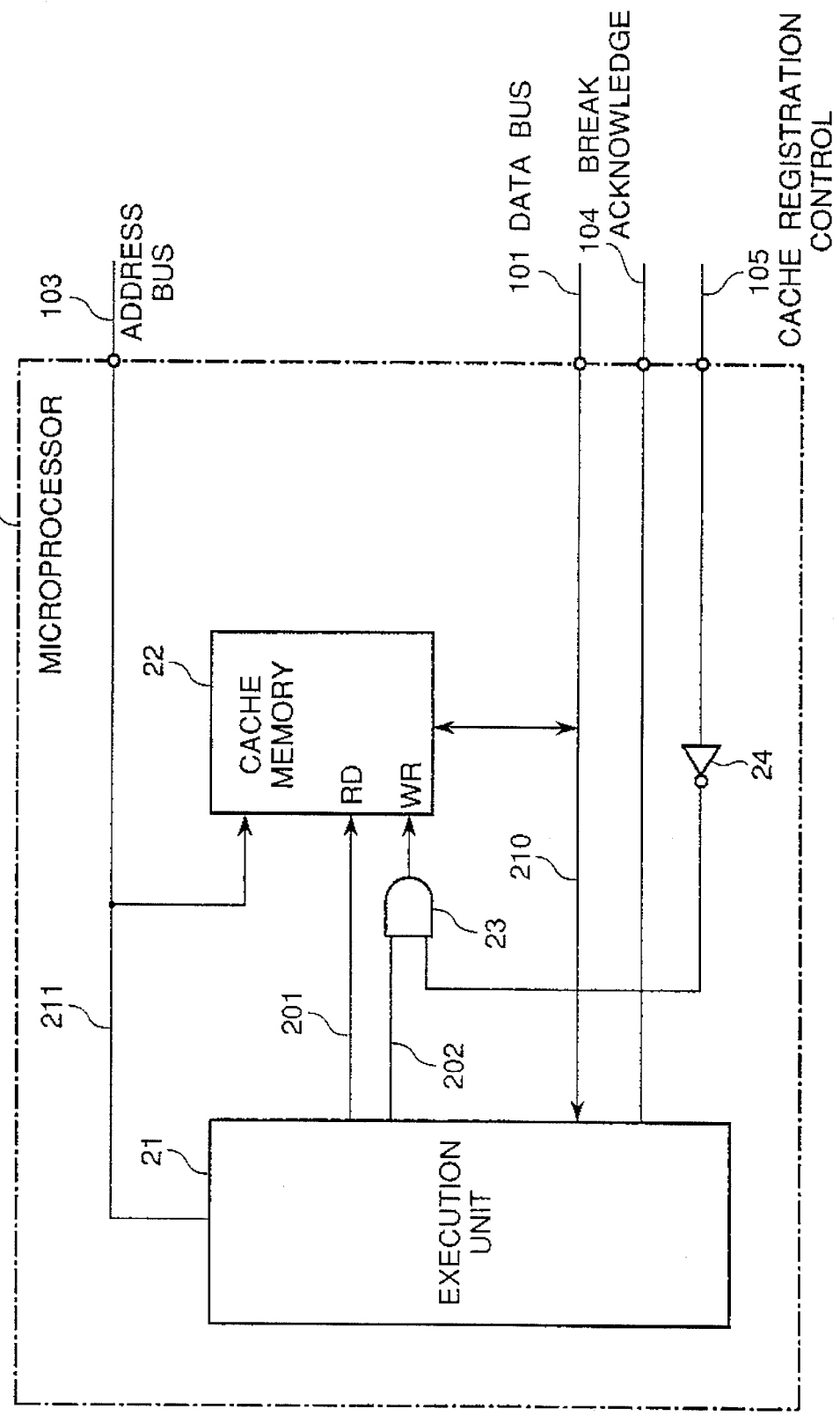
FIG. 4 is a block diagram of an internal structure of the microprocessor in the first embodiment shown in FIG. 3.

Referring to FIG. 4, the microprocessor 11 is composed of an execution unit 21 and the cache memory 22, which are coupled to an internal data bus 210 connected to the data bus 101 and also coupled to an internal address bus 211 connected to the address bus 103. The execution unit 21 generates the above mentioned break acknowledge signal 104.

The cache memory 22 receives a cache read signal 201 from the execution unit 21, and also a cache write signal 202 through and AND circuit 23 from the execution unit 21. Another input of the AND circuit 23 is connected to receive through an inverter 24 the cache registration control signal 105.

Returning to FIG. 3, the microcomputer development support system includes a user memory 12 provided in a user system and coupled to a second data bus 102, a background monitor 15 provided independently of the user memory 12 and coupled to the second data bus 102, for generating a cache registration invalid signal 106 to an OR circuit 18. The microcomputer development support system also includes a memory space switching circuit 17 which is coupled to the address bus 103 and the user memory 12 through another address bus 108, and which is also connected to receive the break acknowledge signal 104, for controlling the background monitor 15 and the user memory 12, so as to switch the access of the microprocessor 11 from the user memory 12 to the background monitor 15 in response to an activated break acknowledge signal 104.

A breakpoint register 14 is coupled to the second data bus 102 and is configured to be set with a break point by a user. A comparator 16 has a first input coupled to the address bus 103 and a second input coupled to the breakpoint register 14, and activates a coincidence signal or break request signal 107 when a content of the breakpoint register 14 becomes coincident with a content on the address bus 103. An instruction substituting circuit 13 is coupled to the first and second data buses 101 and 102 and is controlled by the break request signal 107 so as to substitute a break instruction for an instruction which should be read to the microprocessor from the user memory 12, when the break request signal 107 is activated. The break request signal 107 is also supplied to the OR circuit 18, which generates the cache registration control signal 105.

Now, an operation of the first embodiment will be explained with reference to FIGS. 3 and 4.

In the case of utilizing the break function of the microcomputer development support system, a user sets the breakpoint register 14 with an address where an interruption is to be generated, in advance of execution of a debugging. The comparator 16 continously compares the content of the breakpoint register 14 with the content on the address bus 103, and if the two contents become coincident, the comparator 16 activates the break request signal 107, which is supplied to the instruction substituting circuit 13 and the OR circuit 18.

In response to the activated break request signal 107, the instruction substituting circuit 13 outputs the break instruction (or a branch instruction) to the data bus 101 instead of an instruction code read from the user memory 12. Furthermore, the OR circuit 18 responds to the activated break request signal 107 to activate the cache registration control signal 105 supplied to the microprocessor 11.

In the microprocessor 11, the cache registration control signal 105 is inverted by the inverter 24, and then, inputted to the AND circuit 23, which generates a logical product between the inverted cache registration control signal 105 and the cache write signal 202 outputted from the execution unit 21. The logical product is applied to the cache memory 22. When the cache registration control signal 105 is active, the cache write signal 202 outputted from the execution unit 21 through the AND circuit 23 to the cache memory 22, is masked by the inverted signal of the activated cache registration control signal 105. Therefore, the break instruction read into the microprocessor 11 is not registered into the cache memory 22. However, since the break instruction is supplied directly to the execution unit 21 by bypassing the cache memory 22, the break instruction is executed by the execution unit 21 if an address where an interrupt is to be generated is executed at that time. If the address concerned is not to be executed at that time but should be executed at a later time, a replacement operation of the cache memory by the break instruction is performed repeatedly If the instruction executed by the executing unit 21 is the break instruction, the break acknowledge signal 104 is activated by the execution unit 11. The break acknowledge signal 104 is supplied to the memory space switching circuit 17.

Thereafter, in order to branch to a predetermined address (designated by the break instruction) the execution unit 201 outputs a branch destination address to the address bus 103. On the other hand, in response to the activated break acknowledge signal 103 notifying that the execution unit 201 has executed the break instruction, the memory space switching circuit 17 selects the background monitor 15 so that the access is to the background monitor 15, not to the user memory 12. Since a program for outputting the execution state to the memory is written in the background monitor 15, the microprocessor 11 executes successively the program written in the background monitor 15.

The operation perforated after this will be explained with reference to a timing chart of FIG. 5, which is a timing chart illustrating the execution of the program in the background monitor 15 by the microprocessor 11.

Figure 5:
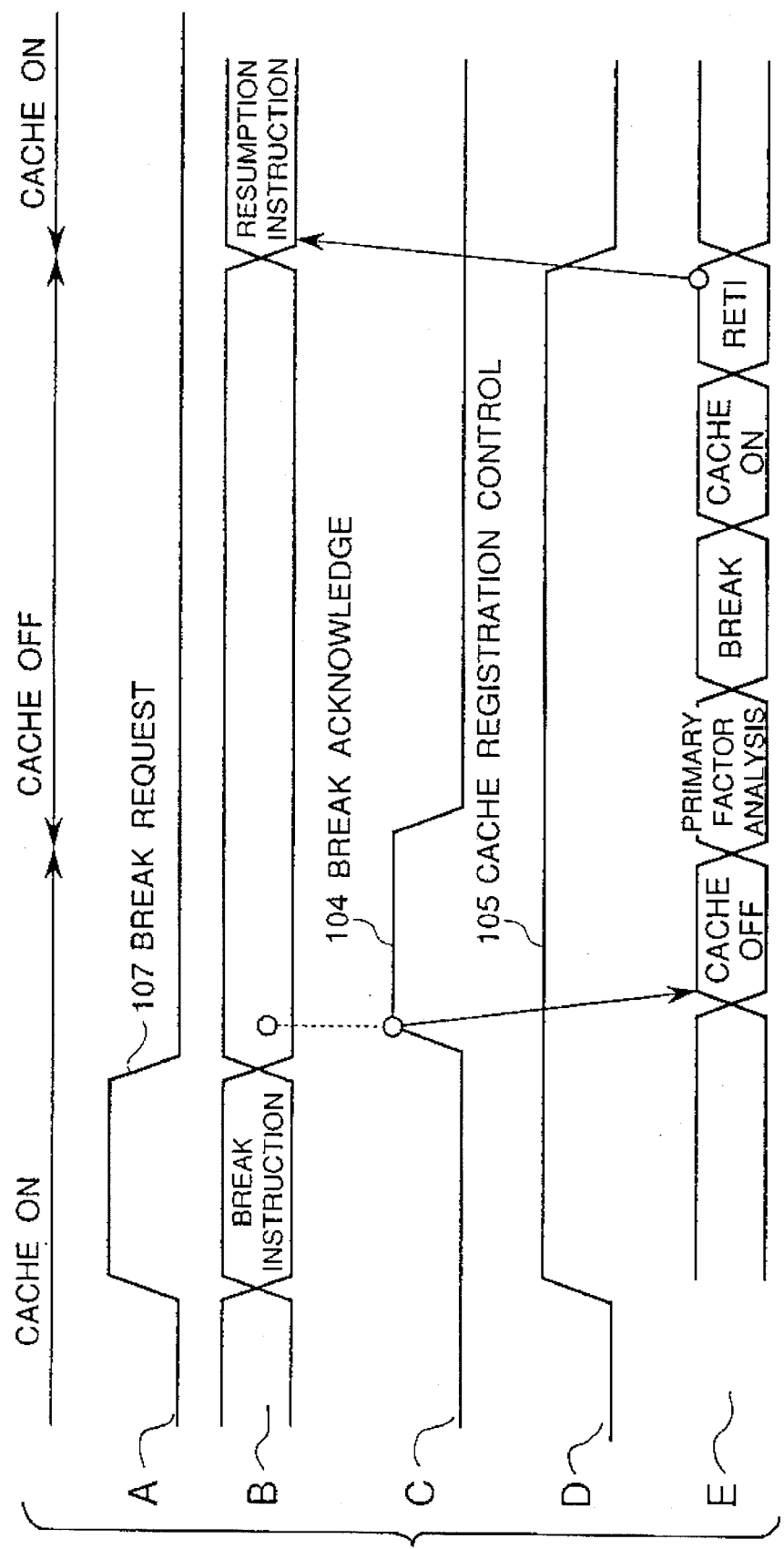
FIG. 5 is a timing chart illustrating an operation of the microcomputer development support system shown in FIG. 3.

In response to the activated break request signal 107 as shown by "A" in FIG. 5, the instruction substituting circuit 13 substitutes the break instruction as shown by "B" in FIG. 5, in place of the instruction which the microprocessor should read at that time in the user space access. In response to the break instruction, the cache memory within the microprocessor 11 is brought into a "cache off" condition, at a head of a program (branch destination program), as shown by "E" in FIG. 5 which illustrates an access of the microcomputer development support system. Thereafter, the background monitor 15 analyzes the primary factor of the break processing, etc., and then, returns the cache memory to a "cache on" condition, and executes the RETI instruction at last. After the RETI instruction is executed, the user program is resumed as shown by "B" in FIG. 5.

During a processing execution based on the background monitor 15, the cache registration invalid signal 106 outputted from the background monitor 15 is maintained active, and therefore, the cache registration control signal 105 is maintained active as shown by "D" in FIG. 5. Accordingly, a replacement,it data is inhibited from being always registered into the cache memory in response to a "cache replace" which is generated at a transition from the "cache on" condition to the "cache off" condition and at a transition from the "cache off" condition to the "cache on" condition. The cache registration control signal 105 has no influence on the memory access in the "cache off" condition.

In the first embodiment mentioned above, the break processing can be executed with only the background monitor 15 without using the front-end monitor which was provided in the user memory 12 in the prior art. Furthermore, the break processing can be executed without registering the break instruction as the result of the instruction substitution and the program (instruction code) of the background monitor into the cache memory 12, and without influencing the user's execution environment.

Next, a second embodiment of the microcomputer development support system in accordance with the present invention will be explained with reference to FIGS. 6 and 7.

Figure 6:
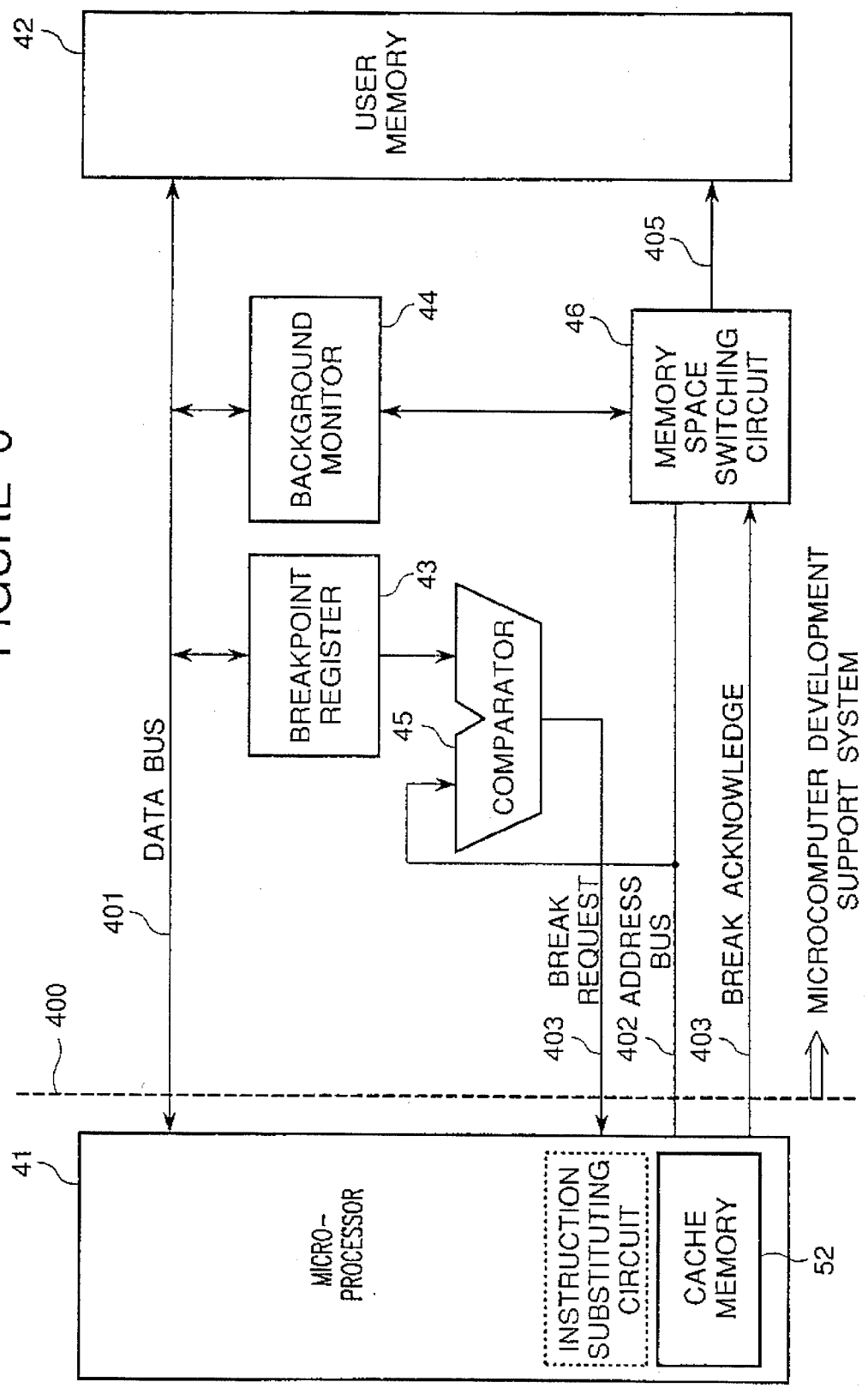
FIG. 6 is a block diagram of a second embodiment of the microcomputer development support system in accordance with the present invention.

FIG. 6 shows a block diagram of the second embodiment of the microcomputer development support system in accordance with the present invention.

The second embodiment is different in construction from the first embodiment in that, in place of the instruction substituting circuit 13 provided independently of the microprocessor 11, a microprocessor 41 provided in the second embodiment internally includes an instruction substituting function.

The second embodiment of the microcomputer development support system is constituted by elements located at a right side of a line 400, and is coupled to a microprocessor 41 which has a cache memory 52 therein and which is also coupled to a data bus 401 and an address bus 402.

Figure 7:
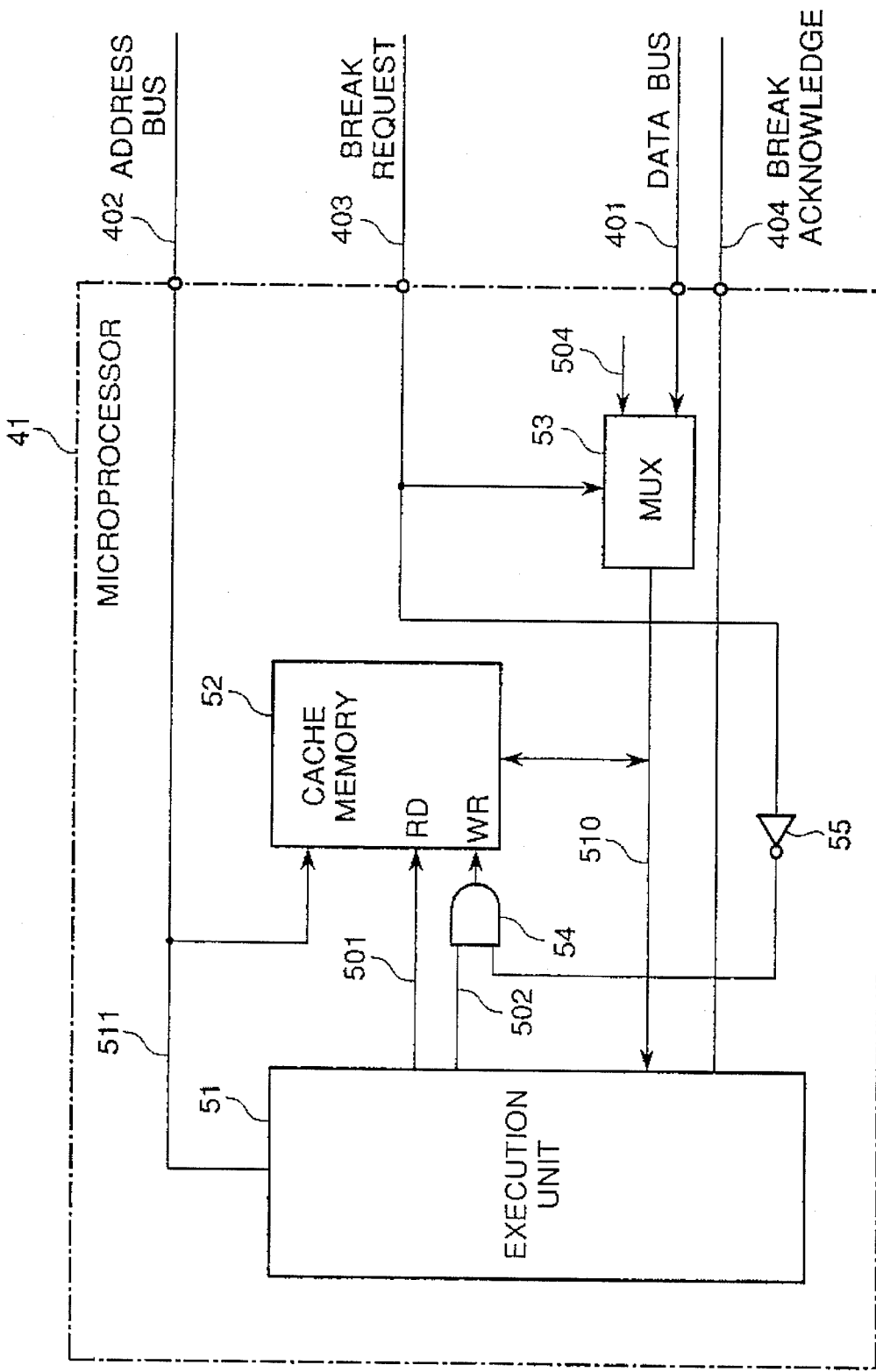
FIG. 7 is a block diagram of an internal structure of the microprocessor in the second embodiment shown in FIG. 6.

Referring to FIG. 7, the microprocessor 41 is composed of an execution unit 51 and the cache memory 52, which are coupled to an internal data bus 510 and an internal address bus 511 connected to the address bus 402. The execution unit 51 generates a break acknowledge signal 404 for informing that the microprocessor 11 has executed a break instruction, and receives through an inverter 55 a break request signal 403.

The cache memory 52 receives a cache read signal 501 from the execution unit 51, and also a cache write signal 502 through an AND circuit 54 from the execution unit 51. Another input of the AND circuit 54 is connected to an output of the inverter 55.

The internal data bus 510 is coupled to an output of a multiplexor 53 having a first input connected to the data bus 401 and a second input connected to receive a break instruction 504 (which is stored in for example in a register). This multiplexor 53 is controlled by the break request signal 403, and performs a function similar to that of the instruction substituting circuit 13 in the first embodiment.

Returning to FIG. 6, the microcomputer development support system includes a user memory 42 provided in a user system and coupled to the data bus 401, a background monitor 44 provided independently of the user memory 12 and coupled to the data bus 401. The microcomputer development support system also includes a memory space switching circuit 46 which is coupled to the address bus 402 and the user memory 42 through another address bus 405, and which is also connected to receive the break acknowledge signal 404, for controlling the background monitor 15 and the user memory 12, so as to switch the access of the microprocessor 41 from the user memory 42 to the background monitor 44 in response to an activated break acknowledge signal 404.

A breakpoint register 43 is coupled to the data bus 401 and is configured to be set with a break point by a user. A comparator 45 has a first input coupled to the address bus 402 and a second input coupled to the breakpoint register 43, and activates a coincidence signal or break request signal 403 when a content of the breakpoint register 43 becomes coincident with a content on the address bus 402.

The multiplexor 53 shown in FIG. 7 is controlled by the break request signal 403 so as to select the break instruction 504 only when the break request signal 403 is active. In the other situations, the multiplexor 53 selects the data on the data bus 401 so as to supply the data on the data bus 401 to the execution unit 51. The break request signal 403 is inverted by the inverter 55, and then, inputted to the AND circuit 54, which generates a logical product between the inverted break request signal 403 and the cache write signal 502 outputted from the execution unit 41. The logical product is applied to the cache memory 52. When the break request signal 403 is active, the cache write signal 502 outputted from the execution unit 41 through the AND circuit 54 to the cache memory 42, is masked by the inverted signal of the activated break request signal 403. Therefore, the break instruction read into the microprocessor 11 is not registered into the cache memory 52. Namely, these series of operations are similar to those of the first embodiment.

In the second embodiment, however, the switching-over to the "cache off" condition is set by an additional information for the memory space (range designated by the address), as mentioned hereinbefore in connection with the prior art.

With this, the memory space of the background memory 44 can be completely set by a program, and therefore, both of the cache registration invalid signal 106 and the cache registration control signal 105 in the first embodiment are no longer necessary, and therefore, omitted in the second embodiment.

The whole operation of the second embodiment excluding the above mentioned matters is similar to that of the first embodiment, and therefore, will be omitted for simplification of description.

As mentioned above, in the microcomputer development support system of the present invention for the microcomputer internally containing the cache memory, the branch instruction is inhibited from being registered into the cache by a predetermined cache registration invalidating function, at the time of the "cache replace" by the instruction substituting circuit. On the other hand, in response to the break instruction, the program of the background monitor is executed in such a manner that when it starts to execute the program of the background monitor, the cache memory is inactivated, and when the execution of the program of the background monitor is terminated, the cache memory is activated. Therefore, the break processing can be executed without using the front-end monitor provided in the user memory. Accordingly, the microcomputer development support system of the present invention is applicable to all user systems without limiting a user memory space (especially, address and contents of program, etc.).

In addition, since the background monitor utilizes only the background monitor or resource within the microcomputer development support system, independently from the user space, even if malfunction occurs in a system being developed by the user, the monitor program itself does not malfunction. Accordingly, an effective program debugging can be made.

Furthermore, since none of the break instruction and the program of the background monitor is registered in the cache memory, there are maintained the condition and the content of the cache memory at the time the user's program is executed. Accordingly, it is possible to debug a program having a real time property.

The invention has thus been shown and described with reference to the specific embodiments. However, it should be noted that the present invention is in no way limited to the details of the illustrated structures but changes and modifications may be made within the scope of the appended claims.

I claim:

1. A microcomputer development support system for a microprocessor, said microprocessor including therein an execution unit for executing a program and a cache memory associated with said execution unit, said microprocessor for inhibiting a cache registration in a cache replacement access to said cache memory, and for putting said cache memory into a "cache off" condition in a programmed manner, said microprocessor generating a break acknowledge signal when said execution unit has executed a predetermined branch instruction, the microcomputer development support system comprising:

instruction substituting means for tracing a memory access of said microcomputer and for responding to a break request signal to supply said execution unit of said microcomputer with said predetermined branch instruction in place of an instruction which has been read from a predetermined address of a user memory to be supplied to said microcomputer;

a background monitor for providing said microprocessor a memory space which is separated from a user space but peculiar to the microcomputer development support system;

a breakpoint register for registering an address where a break processing is to be performed;

a comparator for comparing a content of said breakpoint register with an address outputted from said microcomputer, and for generating said break request signal when coincidence is detected;

a memory space switching circuit for receiving said break acknowledge signal and said address outputted from said microprocessor, for separating said background monitor from said user memory, so that said background monitor functions as the memory space which is separated from the user space but is peculiar to the microcomputer development support system, whereby after said break request signal is activated, a processing is performed based on a program of said background monitor, said microcomputer for responding to said break request signal to put said cache memory into said "cache off" condition when said program of said background monitor begins to execute, said microcomputer returning said cache memory into a "cache on" condition when the execution of said program of said background monitor is terminated, wherein said background monitor generates a cache registration invalid signal when said execution unit of said microcomputer is supplied with said predetermined branch instruction in place of the instruction which has been read from said user memory to be supplied to said microcomputer, wherein said instruction substituting means is located externally of said microprocessor, said development support system further comprising an OR circuit for receiving said break request signal and said cache registration invalid signal and for generating a cache registration control signal, and wherein said microcomputer generates a logical product of said cache registration control signal and a cache write signal outputted from said execution unit to said cache memory, and to inhibit, when said logical product is active, said branch instruction from being registered into said cache memory.

2. A microcomputer development support system claimed in claim 1, wherein said microprocessor includes an inverter and an AND circuit having a first input connected to receive said cache write signal and a second input connected to receive said cache registration control signal through said inverter, an output of said AND circuit being supplied to said cache memory as a cache write signal.

3. A microcomputer development support system for a microprocessor, said microprocessor including therein an execution unit for executing a program and a cache memory associated with said execution unit, said microprocessor for inhibiting a cache registration in a cache replacement access to said cache memory, and for putting said cache memory into a "cache off" condition in a programmed manner, said microprocessor generating a break acknowledge signal when said execution unit has executed a predetermined branch instruction, the microcomputer development support system comprising:

instruction substituting means for tracing a memory access of said microcomputer and for responding to a break request signal to supply said execution unit of said microcomputer with said predetermined branch instruction in place of an instruction which has been read from a predetermined address of a user memory to be supplied to said microcomputer;

a background monitor for providing said microprocessor a memory space which is separated from a user space but is peculiar to the microcomputer development support system;

a breakpoint register for registering an address where a break processing is to be performed;

a comparator for comparing a content of said breakpoint register with an address outputted from said microcomputer, and for generating said break request signal when coincidence is detected;

a memory space switching circuit for receiving said break acknowledge signal and said address outputted from said microprocessor, for separating said background monitor from said user memory, so that said background monitor functions as the memory space which is separated from the user space but is peculiar to the microcomputer development support system, whereby after said break request signal is activated, a processing is performed based on a program of said background monitor, said microcomputer for responding to said break request signal to put said cache memory into said "cache off" condition when said program of said background monitor begins to execute, said microcomputer returning said cache memory into a "cache on" condition when the execution of said program of said background monitor is terminated, wherein said microprocessor includes said instruction substituting means therein, wherein said instruction substituting means comprises a multiplexer, which receives said predetermined break instruction and the content read from said user memory, said multiplexer being controlled by said break request signal so as to output to said execution unit said predetermined break instruction only when said break request signal is active and the content read from said user memory in other situations.

4. A microcomputer development support system claimed in claim 3, wherein said microprocessor includes an inverter and an AND circuit having a first input connected to receive a cache write signal outputted from said execution unit toward said cache memory and a second input connected to receive said break request signal through said inverter, an output of said AND circuit being supplied to said cache memory as a cache write signal.

* * * * *